Oct. 6, 1970  G. A. GODWIN  3,532,253

CONSTANT WEIGHT FEEDING APPARATUS

Filed Nov. 12, 1968  3 Sheets-Sheet 1

INVENTOR.
GILBERT A. GODWIN
BY
Norris & Bateman
ATTORNEYS

Oct. 6, 1970            G. A. GODWIN            3,532,253

CONSTANT WEIGHT FEEDING APPARATUS

Filed Nov. 12, 1968            3 Sheets-Sheet 3

INVENTOR.
GILBERT A. GODWIN
BY
Norris & Bateman
ATTORNEYS

United States Patent Office 3,532,253
Patented Oct. 6, 1970

3,532,253
CONSTANT WEIGHT FEEDING APPARATUS
Gilbert A. Godwin, Oakland, N.J., assignor to Howe Richardson Scale Company, Clifton, N.J., a corporation of Delaware
Filed Nov. 12, 1968, Ser. No. 775,043
Int. Cl. B67d 5/08
U.S. Cl. 222—58
18 Claims

ABSTRACT OF THE DISCLOSURE

A constant weight feeding apparatus which operates on a loss-in-weight principle to maintain the rate at which material is fed away from a receptacle substantially constant by electrically comparing a preset, rate-setting ramp signal voltage with a signal voltage that is representative of the decreasing weight in the receptable to produce a rate-correcting error signal voltage and by providing a feeding device, such as a vibratory feeder, which is responsive to the error signal voltage to control the rate at which material is fed away from the receptacle.

FIELD OF INVENTION

The present invention relates to feeding apparatus of the type which feed bulk material or other fluids from a source of supply at a continuous, controlled, pre-selected rate. More particularly, this invention is concerned with a novel constant weight feeder and constitutes an improvement over earlier types of such feeders as disclosed, for example, in U.S. Letters Patent No. 3,329,313, issued on July 4, 1967, to G. C. Mayer.

BACKGROUND

In the feeding apparatus described in the patent mentioned above the rate at which material is discharged from a receptacle, such as a weigh hopper, is maintained substantially constant by an electrical control circuit having an integrator which responds to a selectively fixed, set point voltage for producing a reference ramp voltage. An error voltage which is produced by comparing the ramp voltage with an input voltage that varies in accordance with weight of material in the weigh hopper is applied to the input circuit of a two-mode, proportional plus reset controller for producing a corresponding corrective output signal. A material flow adjusting device, such as a vibrating feeder, responds to the controller output signal to control the discharge rate of the material from the weigh hopper.

In response to a pre-determined depletion of the material in the weigh hopper the hopper is automatically refilled with material delivered from a storage bin, and during the refilling cycle, the integrator is converted into a unity gain amplifier and the set point voltage is replaced with the voltage representing the weight of the material in the weigh hopper to cause the measured difference between the compared voltages to go to zero. The reset action of the controller is effective when the measured difference goes to zero to maintain the controller output signal at the value it had immediately prior to the initiation of the refilling cycle. This has the effect of reducing the feed rate error during refilling. Although this form of feed controlling system operates satisfactorily, it was found that three factors mainly contributed to undesirable deviations from a uniform discharge rate of material.

One factor pertains to the locking or fixing of the controller output signal voltage at the value which exists at the time when the refilling cycle is initiated. In this connection, it was found that during discharge, the scale signal representing the weight of material in the weigh hopper fluctuates to such an extent that the rate-representing differential of the scale signal may deviate considerably from the mean feed rate which more closely approaches the ideal, pre-selected rate. Since the initiation of the refilling cycle depends only upon the time when a pre-determined depletion of material occurs in the hopper, the differential of the scale signal may not coincide with the desired feed rate at the moment the switchover is made to refill the hopper. As a result, the controller output signal at this moment may deviate appreciably from a desired steady state value needed to minimize the actual feed rate deviation from the pre-selected rate during the refill cycle.

The second factor impairing accurate control over the actual feed rate results from a step change in the signal voltage which is applied to the input circuit of the controller when the integrator is converted into a unity gain amplifier to track the scale signal voltage. This causes a change in potential at a capacitor in the controller to produce an objectionable step in the controller output voltage level.

The third factor contributing to inaccuracies of the control circuit described in the patent identified above occurs when the fixed reference voltage, which is applied to the integrator to generate the ramp signal, is selectively and abruptly changed. When such a change is effected, the response of the control circuit is not immediate to produce a corresponding change in the controller output signal. As a result, there will be an objectionable time lag before the error signal assumes a value to correct the controller to feed at the newly selected rate.

OBJECTS AND SUMMARY OF INVENTION

It is a major object of this invention to provide a novel constant weight feed control circuit which improves the feed rate accuracy by overcoming the foregoing objectionable conditions of the feeder described in Pat. No. 3,329,313.

Another object of this invention is to provide a novel control circuit for accurately controlling the rate at which material is discharged from a plurality of scales, hoppers, or receptacles.

Still another object of this invention is to provide a novel rate control circuit which can be modularized by applying it to printed circuits.

According to this invention two conditions must be present in order to initiate the refilling cycle. One is that the scale signal voltage, representing the decreasing weight of material in the hopper or other receptacle, reduces to a pre-selected level. The other is that the derivative of the error signal voltage (i.e., the difference between the scale signal and ramp signal) is zero. This is accomplished by applying the error signal voltage, which is representative of the measured difference between the scale signal voltage and the rate-setting ramp signal voltage, to the input of an electrical differentiating circuit which produces an output voltage representative of the differential of the error signal voltage.

If the scale signal voltage has reduced to or is below the level calling for initiation of the refill cycle, the differentiating circuit output signal upon becoming zero initiates operation of a switching circuit which converts the integrator into a unity gain amplifier, applies the scale signal to the integrator in place of the fixed, set point reference signal, and opens a gate to allow material in the storage bin to be delivered to the hopper. As a result, the controller output signal voltage will be fixed at a value corresponding to a value of the error signal voltage whose differential is zero. Optimum rate-controlling corrective action is thereby afforded during the refill cycle.

To avoid the objectionable step response that may occur in the controller output signal when the switchover is made to convert the integrator into a unity gain amplifier and to cause it to track the scale signal voltage, the second stage or output amplifier which provides the output voltage of the two-mode controller is automatically disconnected from the reset circuit of the controller when the switchover is made to reduce the error signal, which is applied to the controller's input circuit, to zero. As a result, any step response developed by the reset network of the controller is not transmitted to the second stage amplifier and therefore cannot affect the output voltage of the controller.

To avoid the objectionable lag that occurs between the time when the fixed, set point reference voltage is selectively changed to change the material feed rate and the time when the controller output signal reflects such a change, circuitry is provided to disconnect the second stage or output amplifier of the controller from the reset and input circuitry and to connect it directly to the device supplying the set point reference signal voltage. Such a device may be a potentiometer, and when the switchover is made, the potentiometer voltage will be applied to the input circuit of the controller's output amplifier in place of the original controller voltage developed by the reset network. As a result, the controller output voltage will respond immediately to an adjustment of the set point reference voltage.

Feeders constructed according to this invention are particularly useful in continuous mixing or continuous blending systems wherein a plurality of such feeders provide for the concomitant delivery of different materials to a common source to make up a mixture having predetermined proportions of the delivered materials. In such continuous mixing or blending systems it is desirable to control the speed of the blending or mixing process or operation.

The circuit of this invention affords a simplified means of effecting such a change. It is accomplished by providing a master control potentiometer or some other device which provides an adjustable fixed reference voltage. The master potentiometer is so connected to the rate setting potentiometers for all the feeders in the continuous or blending system that by adjusting the master potentiometer the ramp-controlling voltages provided by rate-setting potentiometers are proportionately adjusted to selectively change the rate at which the materials are fed to the blending or mixing point.

The control circuit of this invention furthermore is such that it is segregated into modules having components which, in addition to performing their necessary functions, are readily adapted for application in the form of printed circuits.

Further objects of this invention will appear as the description proceeds in connection with the appended claims and the annexed drawings described below.

DETAILED DESCRIPTION

Figure 1:
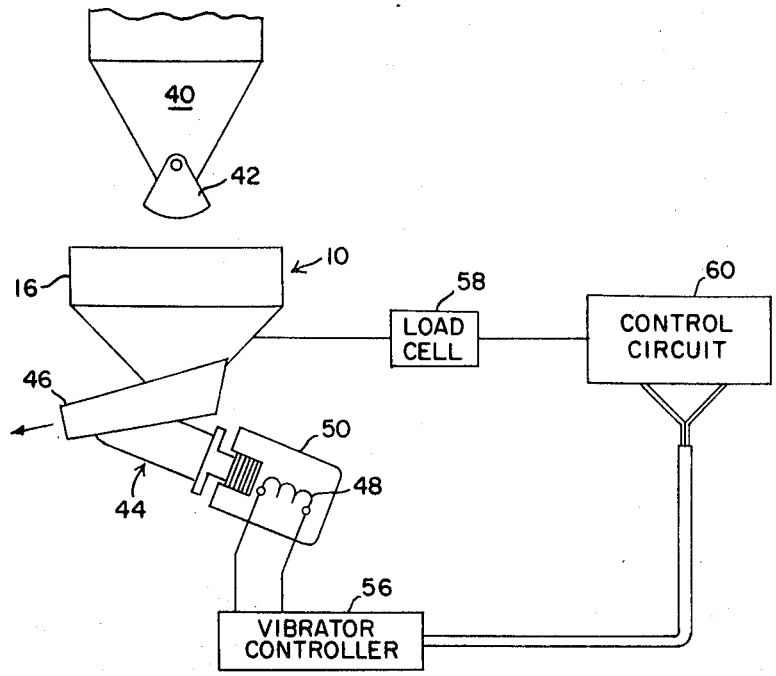
FIG. 1 is a diagrammatic view of a feeding apparatus incorporating the principles of this invention.

Referring now to the drawings and more particularly, to FIG. 1, the reference numeral 10 generally designates a scale which may be of any suitable, conventional form and which comprises a hopper 16 having an open top and a bottom discharge opening. A material storage bin 40 has a bottom outlet opening disposed above weigh hopper 16 to deliver material thereto. Discharge of material from storage bin 40 is controlled by a conventional, solenoid-operated gate 42 in a manner to be described in detail later on.

Material in weigh hopper 16 is removed in a continuous stream through the bottom opening in the hopper by a vibrating feeder assembly 44 of suitable, conventional form. Alternatively, it is clear that any form of suitable, conventional feeding arrangement may be employed in place of feeder assembly 44. Feeder assembly 44 preferably is the same as the feeder assembly described in the previously mentioned Pat. No. 3,329,313 and is shown to essentially comprise a feed chute 46 disposed below the bottom opening of hopper 16 and vibrated at high frequency by energizing field winding 48 of an electro-magnetic motor 50. The rate at which material is fed by feeder assembly 44 to a selected place is controlled by the amplitude of vibrations applied to feed chute 46 by motor 50, and the amplitude of these vibrations is controlled by the strength of current supplied to energize winding 48.

A force transducer assembly comprising at least one load cell 58 is operatively connected to hopper 16. The weight of hopper 16 and the material therein is applied to load cell 58, and the load cell output signal may be tared by deducting the weight of the hopper as is well known in the art, to provide a D.C. analogue output signal voltage which is proportional to the weight of material in the hopper. It will be appreciated that a plurality of such load cells may be employed to support hopper 16.

Load cell 58 may be of any suitable, conventional form, but preferably is of the strain gauge type. In place of load cell 58 it will be appreciated that any form of suitable, conventional force transducer may be used. The output signal of load cell 58 is applied to the contorl circuit of invention, which is indicated at 60 in FIG. 1. Circuit 60 responds to the loss in weight of material in hopper 16 to control the amplitude of vibrations produced by feder assembly 44 through a vibrator controller 56 to maintain the rate at which material is feed way from hopper 16 substantially constant. In addition to controlling the feed rate of material, circuit 60, as will be described in detail later on, also controls operation of gate 42 to cyclically refill hopper 16 when the supply of material therin has ben depleted by a pre-selected amount. This is accomplished without interrupting the delivery of material from hopper 16.

Figure 2A:
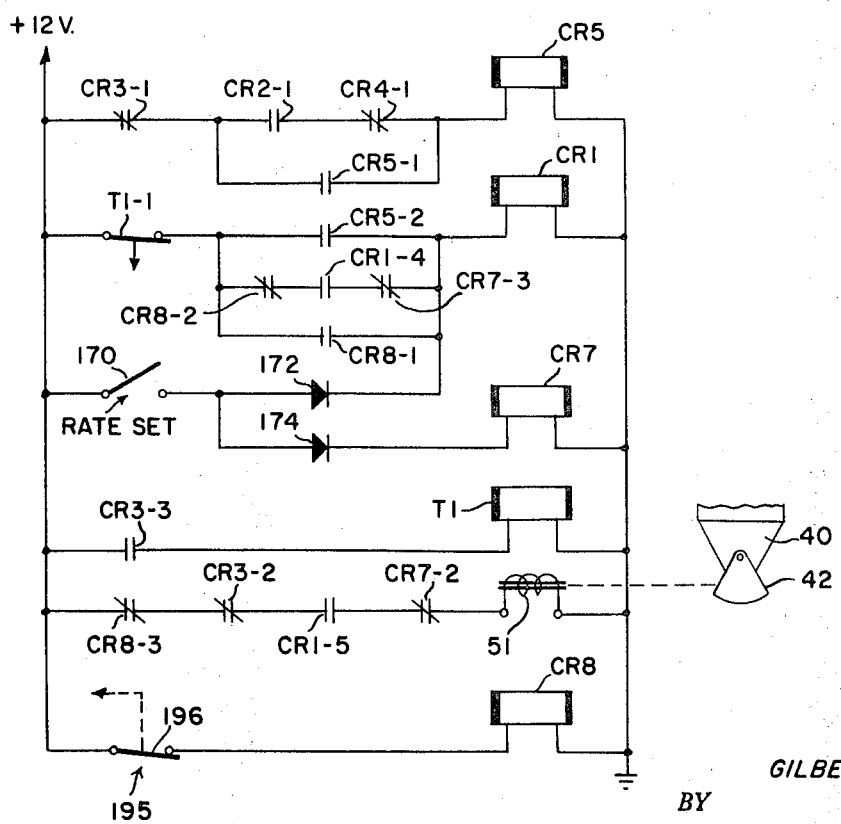
FIGS. 2 and 2A illustrate the control circuit shown in block form in FIG. 1, with the circuitry in FIG. 2A being a continuation of the circuitry shown in FIG. 2.
Figure 2:
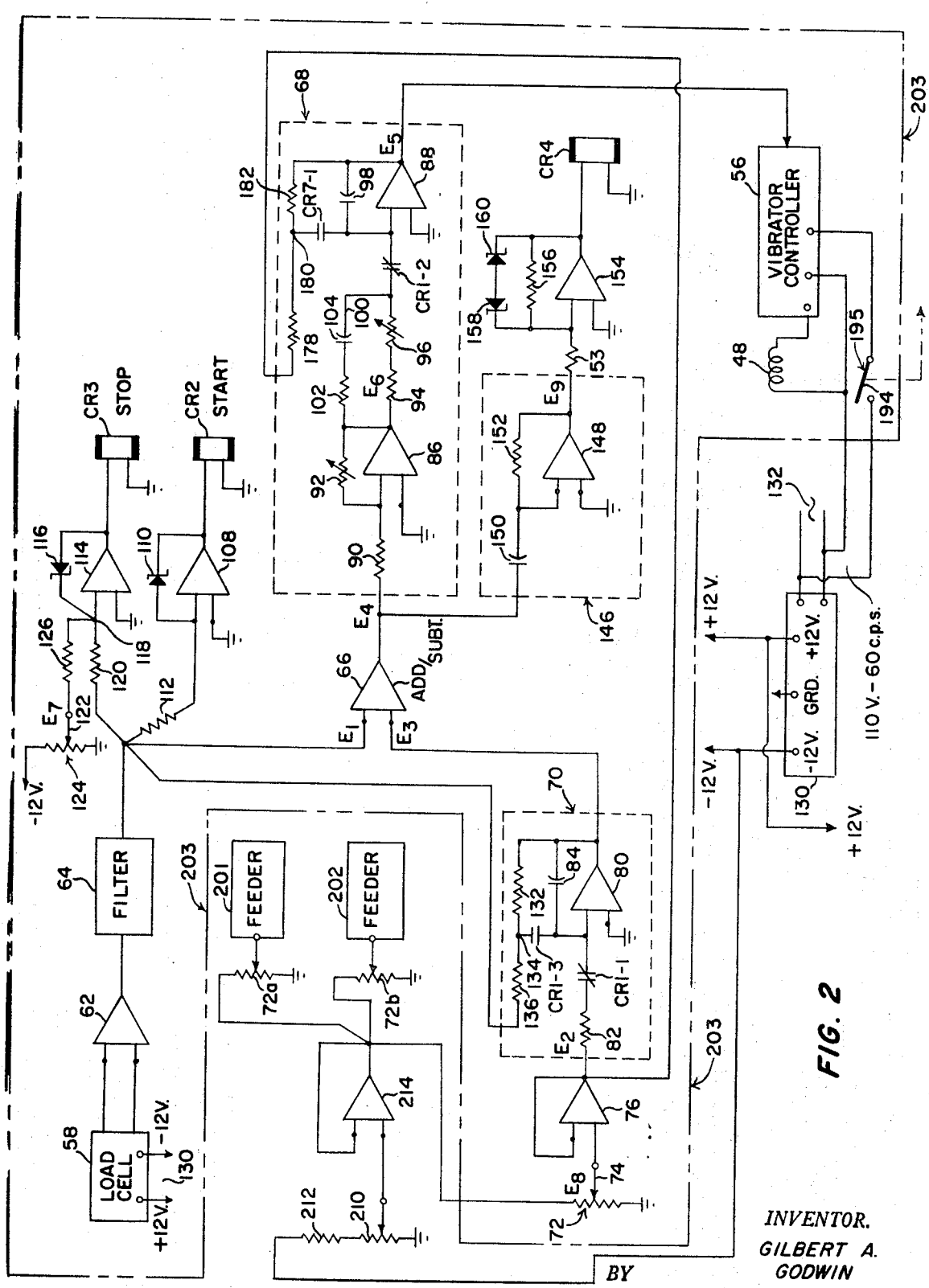

As shown in FIG. 2, circuit 60 comprises a load cell signal amplifier 62 having its input terminals connected to the output terminals of load cell 58 to amplify the load cell signal voltage. The amplified output of amplifier 62 is transmitted through an electrical filter 64 for application to an input terminal of a summing amplifier 66. Amplifier 66, as well as a two-mode electronic controller 68, an integrator circuit 70, and a rate-setting, set point potentiometer 72 all form a part of control circuit 60.

Filter 64 is operative to filter out A.C. components that may have been superimposed upon the amplified D.C. load cell signal. Preferably, filter 64 is a low pass type having good frequency and time response characteristics to develop an output signal voltage which is substantially free of A.C. or other time base components that might interfere with the trouble-free operation of the control circuit. The amplified and filtered load cell signal, which is indicated at $E_1$ in FIG. 2, is applied to one input terminal of amplifier 66.

Still referring to FIG. 2, the resistance of potentiometer 72 is connected across a D.C. voltage source in a manner to be described in detail later on, and the potentiometer wiper, which is indicated at 74, is connected to the inverting input terminal of a voltage follower 76. The output of follower 76 connected to the input of integrator circuit 70 to impress thereon a fixed set point D.C. signal voltage indicated at $E_2$. Follower 76 provides a buffered input to integrator circuit 70, reflecting a high impedance to wiper 74 to avoid loading errors. All of the amplifiers in circuit 60 are preferably of the operational type.

Integrator circuit 70, as will be described in detail later on, responds to the fixed set point voltage to generate a linear ramp voltage $E_3$ as is well understood in the art. The slope of ramp voltage $E_3$ is determined by and is directly proportional to the voltage at wiper 74 or, more specifically, the voltage applied across wiper 74 and ground. Integrator circuit 70 thus converts the fixed potentiometer voltage signal into the rate-setting ramp signal $E_3$.

Signal $E_3$ is impressed upon the second input terminal of amplifier 66 which compares signal $E_3$ with signal $E_1$ to produce an error signal voltage $E_4$ which is a measure of the difference between the magnitudes of signals $E_1$ and $E_3$. The error voltage $E_4$ is impressed on controller 68 causing it to develop a corresponding output signal voltage $E_5$. Controller 68 is provided with a proportional plus reset control action of conventional form. The output signal of controller 68 is impressed on vibrator controlled 56 to control the feed rate of material flowing from chute 46. Controller 56 may be the same as that described in Pat. No. 3,329,313.

Still referring to FIG. 2, integrator circuit 70 comprises an amplifier 80 having its non-inverting input terminal connected to ground. The inverting input terminal of amplifier 80 is connected to the output cricuit of follower 76 serially through a set of normally closed contacts CR1–1 of a relay CR1 and a resistor 82. When contacts CR1–1 are closed, therefore, the selectively fixed reference voltage on wiper 74 is fed to amplifier 80, and amplifier 80 coacts with a feedback capacitor 84 in a manner well understood in the art to perform an integrating transfer function for converting the fixed reference voltage into the rate-setting ramp voltage $E_3$. Ramp voltage $E_3$ is thus equal to $t - E_2 R_1 C_1$ where $R_1$ and $C_1$ respectively represent the values of resistor 82 and capacitor 84 and where $t$ is time.

As shown in FIG. 2, controller 68 comprises a first-stage adder-subtractor amplifier 86 and a second-stage amplifier 88. The output of amplifier 66 is connected through an input resistor 90 to one input terminal of amplifier 86. The other input terminal of amplifier 86 is clamped to ground. Amplifier 86 has a variable feeback resistance 92 so that it will amplify signal voltage $E_4$ to an amount determined by the ratio of feedback resistance 92 to the input resistor 90. The output of amplifier 86 in indicated at $E_6$, and this voltage, still representing the error or, more specifically, the measured difference between signals $E_1$ and $E_3$ (namely, $E_1 - E_3$, is applied serially through a dropping resistor 94, a variable resistor 96 and a set of normally closed contacts CR1–2 of relay CR1 to the inverting terminal of amplifier 88. As a result, the amplified error signal $E_6$ is impressed on the input circuit of amplifier 88.

Amplifier 88 is connected to a conventional reset network which comprises a capacitance feedback 98 and an RC coupling branch 100. Branch 100 is connected between the output of amplifier 86 and the inverting input terminal of amplifier 88 in parallel with resistors 94 and 96 and comprises, in series, a dropping resistor 102 and a capacitor 104. The transfer function of this network is well understood in the art. In response to the impression of signal voltage $E_4$ on its input circuit, controller 68 thus produces a corrective output signal voltage $E_5$ that depends not only upon the magnitude of the error signal (i.e., $E_1 - E_3$) but also upon its duration as is well known in the art. As a result, the corrective output signal $E_5$ is a function of time and magnitude of the deviation from the rate-setting reference ramp signal generated by integrator circuit 70. Voltage $E_5$ therefore represents the corrective signal resulting from cascading the proportional and reset modes of controller 68.

With continued reference to FIG. 2, operation of gate 42 is controlled by a start refill relay CR2 and by a stop fill relay CR3. Relays CR2 and CR3 are preferably of the non-polar type. The circuitry for controlling operation of relay CR2 comprises an operational amplifier 108 and a Zener diode 110. The non-inverting input terminal of amplifier 108 is clamed to ground, and the inverting input terminal of amplifier 108 is connected through a resistor 112 to the output circuit of filter 64. Diode 110 has its anode gate and its cathode gate respectively connected to the inverting input terminal of amplifier 108 and the output circuit of amplifier 108 to provide a feedback loop for controlling the gain of the amplifier. The winding terminals of relay CR2 are respectively connected to ground and to the output circuit of amplifier 108.

With the relay controlling circuitry just described the amplified and filtered load cell signal $E_1$ is applied through resistor 112 to the inverting terminal of amplifier 108, and the value of this signal is so adjusted that it goes to zero when the amount of material in hopper 16 has depleted to a predetermined value calling for the initiation of the refill cycle. It will be appreciated that at this stage some material still remains in hopper 16 to ensure the continuous delivery of material.

As long as the value of signal $E_1$ remains positive, diode 110 will be forward biased to clamp the voltage at the output of amplifier 108 to the voltage appearing at the amplifier's inverting input terminal. Owing to the low forward resistance of Zener diode 110 in the operational amplifier feedback loop and the extremely high gain of the operational amplifier 108, the closed loop gain of this circuit approaches zero. Because of the well known operational amplifier theory and practice under these conditions the inverting input terminal of amplifier 108 is a virtual ground, and the amplifier output voltage is approximately equal to the forward biased voltage drop of Zener diode 110. Thus when diode 110 is forward biased the voltage drop across the operating winding of relay CR2 is insufficient to cause energization of the relay. When relay CR2 is de-energized, gate 42 will be closed to prevent delivery of material to hopper 16.

When signal $E_1$ reaches its zero value and starts to go negative by virtue of the continued discharge of material from hopper 16, diode 110 becomes reversed biased. This is evident from the fact that for a very small difference between the voltages applied to the amplifier inverting and non-inverting terminals, an operational type amplifier produces its maximum output voltage which is either positive or negative depending upon the direction of the difference. This is due to the open loop gain characteristics of operation amplifiers and this particular circuit closed loop gain characteristics. Thus, when signal $E_1$ starts to go negative diode 110 will be reversed biased, and under such conditions it will not conduct until the amplifier output voltage reaches the diode's firing or Zener point. The Zener point may be 10 volts or any other suitable level which is sufficiently above the potential needed for energizing relay CR2.

Since the open loop gain of amplifier 108 is very high and the Zener diode impedance is very high below the Zener point when reversed biased the output voltage will build up rapidly to the Zener point for the relatively small signal voltage differential applied to the input circuit of the amplifier. When the Zener point is reached, the Zener diode impedance reduces and diode 110 consequently conducts to limit the amplifier output voltage to 10 volts. As a result, a voltage drop is applied across the operating winding of relay CR2 which is sufficient to energize the relay. Energization of relay CR2 together with the energization of a further relay CR5 and of relay CR1 opens gate 42 to refill hopper 16 in a manner to be described in detail later on.

As shown in FIG. 2, the circuitry controlling operation of relay CR3 is similar to that just described for relay CR2 and comprises an operational amplifier 114 and a Zener diode 116. The non-inverting and inverting terminals of amplifier 114 are respectively connected to ground and a signal voltage summing junction 118. The output circuit of filter 64 is connected through a summing resistor 120 to junction 118. Also, a wiper 122 of a potentiometer 124 is connected through another summing resistor 126 to junction 118. The resistance of potentiometer 124 is connected between ground and a negative voltage terminal of a suitable D.C. power supply source such as a filtered and regulated full wave rectifier module 130. Module 130 is operative to convert A.C. line power at 132 into a relatively low D.C. biasing voltage as indicated in FIG. 2. Operating power for load cell 58 and the amplifiers in circuit 60 may be supplied from module 130.

Diode 116 has its cathode gate and its anode gate respectively connected to junction 118 and to the output circuit of amplifier 114 to provide a feedback loop for controlling the gain of the amplifier. The winding terminals of relay CR3 are respectively connected to ground and the output circuit of amplifier 114.

Potentiometer 124 is adjusted to apply to wiper 122 a negative signal voltage $E_7$ which represents the amount of material to be delivered from storage bin 40 during each refill cycle. Since relay CR2 is energized to begin the delivery of material to hopper 16 when signal $E_1$ reduces to essentially zero, the algebraic summation of signals $E_7$ and $E_1$ will be negative until the amount of material delivered to hopper 16 during the refilling cycle becomes equal to or greater than the setting of potentiometer 124. As a result, diode 116 will be forward biased until the pre-selected amount of material is delivered to hopper 16 according to the setting of potentiometer 124.

With diode 116 forward biased, the output of operational amplifier 114, for the reasons already explained, will be clamped substantially to the forward voltage drop of diode 116 when it is forward biased. Relay CR3 will consequently remain de-energized essentially until diode 116 becomes reverse biased.

When sufficient material is delivered to hopper 16 the algebraic summation of signals $E_1$ and $E_7$ goes to zero and starts to go positive so that a very small positive difference appears at the input circuit of amplifier 114 to reversely bias diode 116. Under such conditions, diode 116 will stop conducting and will remain non-conductive until its Zener point is reached. The output voltage of amplifier 114 will therefore build up rapidly for the relatively small signal voltage difference applied to the ampifier input terminals. When the amplifier output voltage reaches the diode's Zener point (which may be 10 volts by way of example), diode 116 will again become conductive to clamp the amplifier output voltage at the Zener point. With this output voltage, a potential is developed to energize relay CR3. Energization of relay CR3 closes gate 42 to stop the delivery of material to hopper 16 in a manner to be described in detail later on.

As will be described in greater detail shortly, energization of relay CR2 and relay CR5 results in the energization of relay CR1. The energization of relay CR1, in addition to opening gate 42, also converts integrator circuit 70 into a unity gain amplifier and replaces the set point reference signal voltage $E_8$ at wiper 74 with the load cell signal voltage $E_1$. During the refill cycle, therefore, circuit 70 tracks the load cell output signal $E_1$, causing the measured difference between signals $E_1$ and $E_3$ to go to zero. The circuitry for accomplishing this conversion and tracking mode during the refill cycle is shown in FIG. 2 to comprise a feedback resistor 132 having its terminals respectively connected to the output circuit of amplifier 80 and a junction 134. The output circuit of filter 54 is also connected to junction 134 through a dropping resistor 136, and junction 134 is connected through a set of normally open contacts CR1-3 of relay CR1 to the inverting input terminal of amplifier 80. This terminal is also connected to capacitor 84 and through normally closed contacts CR1-1 to the output circuit of follower 76. The branch containing resistor 132 in series with contacts CR1-3 is in parallel with the feedback loop containing capacitor 84.

From the foregoing it will be appreciated that contacts CR1-1 will open and contacts CR1-3 will close when gate 42 is opened to refill hopper 16 with material stored in bin 40. By opening contacts CR1-1, potentiometer 72 is disconnected from amplifier 80, and by closing contacts CR1-3 the filtered and amplified load cell signal $E_1$ is applied to the input circuit of amplifier 80 in place of signal voltage $E_8$. As a result of closing contacts CR1-3 resistor 132 will also be connected to same input terminal of amplifier 80 in parallel with capacitor 84.

The value of resistors 132 and 136 are selected to convert amplifier 80 into a unity gain amplifier. Thus, when relay CR1 is energized the output $E_3$ of amplifier 80 will become equal to $-E_1$. It therefore will be appreciated that the error signal $E_4$, which is developed by comparing signals $E_1$ and $E_3$ in amplifier 66, reduces to zero whenever relay CR1 is energized. In this manner, integrator circuit 70 tracks the output of load cell 58 during the refill cycle.

By closing contacts CR1-3 during the refilling cycle capacitor 84 will be charged by the load cell output signal $E_1$, and when contacts CR1-1 close at the end of the refilling cycle, the charge on capacitor 84 will be equal to signal voltage $E_1$. Accordingly, the ramp generated by integrator circuit 70 upon switching back to potentiometer 72 will start at a voltage that is equivalent to signal voltage $E_1$. With amplifier 80 again connected to potentiometer 72, the slope of the generated ramp signal $E_1$ will then be determined by the voltage $E_8$ at wiper 74. In this fashion, the integrating function of circuit 70 is correlated with the load cell output signal $E_1$ to ensure an accurate reflection of any deviation from the selected feed rate.

With the constant weight feed system thus far described, it was found that the loss in weight of material in hopper 16 is not at an absolutely constant rate. Instead, it will fluctuate, causing the load cell output signal $E_1$ to correspondingly fluctuate as indicated by the non-linear curve 140 in FIG. 3. Curve 140 is shown to undulate above and below the pre-selected linear ramp signal $E_3$ which is indicated at 142 in FIG. 3.

Although the mean value of curve 140 closely approaches that of the linear ramp 142, the actual slope of curve 140 at the point where the load cell signal calls for the initiation of the refill cycle (i.e., zero voltage in this embodiment) can, at random, vary throughout a wide range of values, depending upon whether curve 140, at such a moment, is on, in effect, an upswing, a downswing, or at one of its peaks, that is, at the point on curve 140 indicated at 141. As a result of this condition, the feed rate control circuit described in the previously mentioned Pat. No. 3,329,313 does not, under certain circumstances, provide for the most accurate control of material feed rate that is available during the refilling cycle. The reasons for this follow.

For both controller 68 and the corresponding proportional plus reset controller in Pat. No. 3,329,313, the controller output signal, which is indicated at $E_5$ herein, is dependent upon the slope of curve 140 for the slope of this curve, which is voltage or an equivalent weight per unit time, as equal to the feed rate. Also, both controller 68 and the corresponding controller in Pat. No. 3,329,313 will lock signal $E_5$ at the value determined by the slope of curve 140 at the moment when the switchover is made to initiate delivery of material to hopper 16 and to reduce the measured difference between signals $E_1$ and $E_3$ to zero by converting integrator circuit into a unity gain amplifier circuit and by causing it to track the load cell output signal $E_1$. This fixed condition of the controller output signal occurs by virtue of the integrating function performed by the controller when the error signal goes to zero.

As mentioned in Pat. No. 3,329,313, it is important to lock the proportional plus reset controller output signal (corresponding to signal $E_5$ herein) at a predetermined value in order to continue corrective control over the feed rate during the refill cycle. However, the only condition required for locking the output signal of the proportional plus reset controller in Pat. No. 3,329,313 is the time when the signal representing the weight in the hopper has decreased to a predetermined switchover level such as zero in this embodiment. At this instant the slope of curve 140 may be at any random value, for curve 140, when passing through the switchover level, may be at its peak, on the upswing, or on the downswing.

Figure 3:
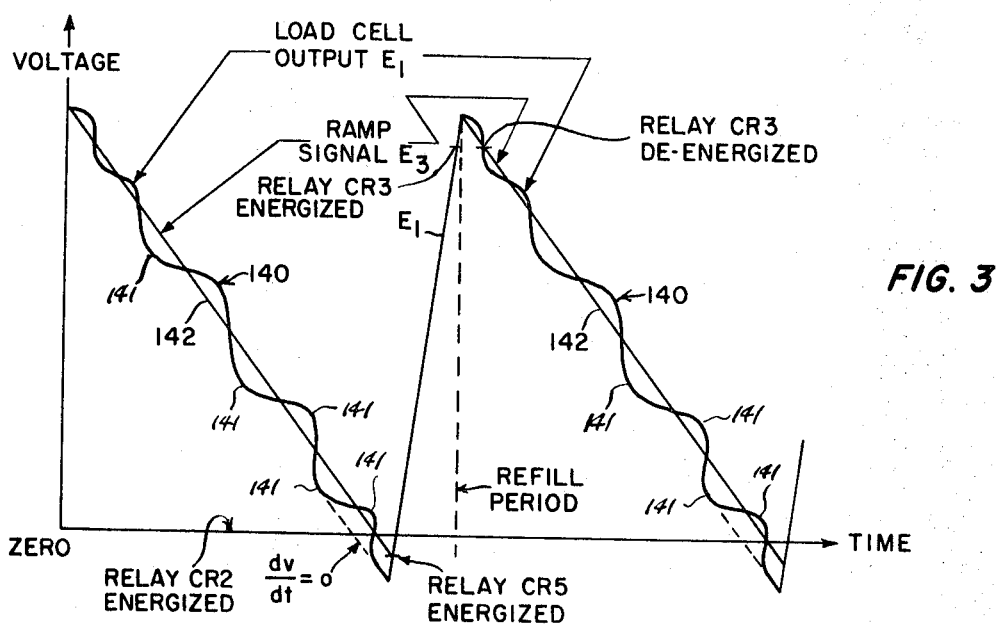
FIG. 3 is a plot of voltage versus time for both the scale signal voltage representing the weight of material in the hopper and the rate-setting ramp voltage signal.

If curve 140 is at one of its points indicated at 141 at the switchover voltage level, the slope of curve 140 at the point where it intersects the switchover voltage level will be substantially parallel to the ramp indicated at 142 in FIG. 3. When such a slope is present at the time the switchover is made to refill hopper 16, the value of the controller output signal will provide the most accurate control over the feed rate during refilling, for the differential (i.e., $dv/dt$) of the difference in magnitude between curves 140 and 142 will be a constant, and this constant will be equal to the preset ramp feed rate.

If, on the other hand, curve 140 is on, in effect, the upswing, or downswing, at the point when the switchover is made to refill hopper 16, the slope of curve 140 will equal something other than the desired feed rate, and the consequent controller output signal will be locked at a value that does not provide for the optimum corrective action during the refilling period The circuit of the present invention overcomes the foregoing problem by making it necessary for two requirements to be fulfilled before the switchover can be effected to lock the corrective output signal $E_5$ at a fixed value. One requirement is that the load cell output signal $E_1$ decreases to a predetermined voltage level. The other is that the differential of signal $E_4$ (i.e., $dE_4/dt$) equals zero.

The electrical circuitry for fulfilling the second requirement mentioned above comprises a differentiator 146 as shown in FIG. 2. Differentiator 146 may be of any suitable, conventional form and is shown to comprise an operational amplifier 148 having its inverting input terminal reactively coupled by a capacitor 150 to the output circuit or amplifier 66. The non-inverting terminal of amplifier 148 is clamped to ground, and a gain controlling feedback resistor 152 is connected between the inverting input terminal and the output circuit of the amplifier. As is well understood in the art, the output signal voltage $E_9$ of differentiator 146 will be equal to $$R_2 C_2 \frac{d_4}{dt}$$

where $R_2$ and $C_2$ are the values of resistor 152 and capacitor 150 respectively.

Still referring to FIG. 2, the output circuit of amplifier 148 is connected through an input resistor 153 to the inverting terminal of a relay-controlling, operational amplifier 154. The non-inverting terminal of amplifier 154 is grounded, and a feedback resistor 156 is connected between the inverting terminal and the output circuit of the amplifier. In parallel with resistor 156 are two series connected Zener diodes 158 and 160. The anode gates of diodes 158 and 160 are connected together, and the cathode gates of diodes 158 and 160 are respectively connected to the inverting input terminal of amplifier 154 and the amplifier's output circuit. Relay CR4, which is controlled by amplifier 154, has its winding terminals respectively connected to ground and to the output circuit of amplifier 154.

When the weight of material in hopper 16 is above the lower limit needed to energize relay CR2 and when material is being discharged from the hopper by virtue of energizing winding 48, relays CR1, CR2, and CR3 will all be de-energized after the prior refill cycle has been completed. At this stage, therefore, chute 46 will be vibrating to discharge material from hopper 16, and relay CR4 may or may not be energized depending upon the value of signal voltage $E_9$.

Under the foregoing conditions, the input circuit of amplifier 80 will be connected to potentiometer 72 and will be disconnected from the output circuit of filter 64. Since capacitor 84 was charged in the previous refill cycle to the value of signal voltage $E_1$, the ramp signal $E_3$ will start out at a value equivalent to the weight of material in hopper 16 and will change at the rate determined by the setting of wiper 74. Amplifier 66, which continuously compares signals $E_1$ and $E_3$, immediately detects an error between the load cell output signal $E_1$ and the rate-setting ramp signal $E_3$, indicating for example, that there is more weight in hopper 16 than that called for by ramp signal $E_3$. The error signal $E_4$ therefore goes negative by an amount proportional to the measured difference between signals $E_1$ and $E_3$, and this finite error signal is impressed upon the input circuit of controller 68. Controller 68 responds to this error signal to increase the corective output signal $E_5$ which, in turn, will cause a corresponding increase in the amplitude of vibrations produced by feeder 44 to discharge material from hopper 16 at an increased rate.

The rate at which material is fed away from hopper 16 will continue to increase with a decreasing weight in hopper, and as a result, the measured difference between signal voltages $E_1$ and $E_3$ will reduce to zero. At this stage, the rate of material discharge will still continue to increase owing to the reset action of controller 68. As a consequence, the magnitude of the ramp signal $E_3$ will become slightly greater than the load cell output signal $E_1$ to cause the error signal $E_4$ to change polarity. Upon completing its reset action controller 68 will respond to the slightly excessive discharge rate to correspondingly reduce the corrective output signal $E_5$. The amplitude of vibrations produced by feeder 44 will consequently decrease to reduce the rate at which material on chute 46 is fed away from hopper 16. In this fashion the load cell output signal $E_1$ will cyclically fluctuate above and below the ramp signal $E_3$ as shown in FIG. 3. It will, however, be appreciated that at any given instant during operation, the deviation of signal $E_1$ from signal $E_3$ is very small and is exaggerated in FIG. 3 for illustrative purposes.

Feeder 44 will continue to discharge material from hopper 16 at the controlled, substantially constant rate just described until the load cell output signal $E_1$ passes its zero refill value and starts to go negative. When this condition occurs, indicating that a predetermined depletion of material in hopper 16 has taken place, diode 110, as previously described, will stop conducting and will become reversed biased. The output voltage of amplifier 108 will consequently build up rapidly to the Zener point of diode 110 and apply a potential for energizing relay CR2.

Energization of relay CR2, as shown in FIG. 2A, closes a set of normally open contacts CR2–1. As a result, a circuit for energizing the start feed relay CR5 will be completed only if a set of normally closed contacts CR3–1 of relay CR3 and a set of normally closed contacts CR4–1 of relay CR4 are closed. As shown, relay CR5 is connected in series with contacts CR3–1, CR2–1, and CR4–1 between the positive terminal of module 130 and ground. Contacts CR3–1 will be closed, for at this stage, diode 116 is forward biased. Contacts CR4–1 may or may not be closed at the instant the load cell signal $E_1$ decreases to the level needed for effecting energization of relay CR2.

The condition of relay CR4 and, consequently, of contacts CR4–1 depend upon signal $E_9$ which, as previously explained, is the differential of the measured difference between signals $E_1$ and $E_3$ and which is therefore a measure of rate or the slope of the load cell output signal curve 140. When the slope of curve 140 is not parallel to the ramp signal $E_3$ and hence is not at the desired rate, the differential signal $E_9$ will have either a finite positive value or a finite negative value depending upon the direction of the rate or, in other words, the direction of the slope of curve 140.

If signal voltage $E_9$ is positive, diode 158 will be reverse biased and diode 160 will be forward biased. This will cause the output voltage of the amplifier to be clamped at a negative voltage equal to the Zener voltage of Zener diode 158 plus the forward voltage drop of Zener diode 160. As a result of this potential relay CR4, which is of the non-polar D.C. type, will energize. This potential for the example illustrated will be about 10.5 volts. When relay CR4 is energized, contacts CR4–1 will be open to prevent energization of relay CR5 even through relay CR2 may, at the time, be energized.

When signal voltage $E_9$ is negative, diode 160 will be reverse biased and diode 158 will be forward biased. This will cause the output voltage of the amplifier to be clamped at a positive voltage equal to the Zener voltage of Zener diode 160 plus the forward voltage drop of Zener diode 158. As a result of this potential, the relay CR4 will energize. This potential for the example illustrated will be about 10.5 volts. Under these conditions, contacts CR4–1 will also be opened to prevent energization of relay CR5.

As will be described shortly, relay CR5 must be energized in order to start delivery of material to hopper 16 and to lock controller 68 such that it will retain signal voltage $E_5$ at the value which existed immediately prior to the switchover for refilling hopper 16. The point of operation or sensitivity of relay CR4 is established by resistor 156 which is placed across the feedback path for reducing the closed loop gain of amplifier 154 when either one of the two Zener diodes 158 and 160 is non-conducting. This will require that the input voltage to be larger in order to operate relay CR4 than when no resistor were present.

From the foregoing it is clear that whenever the slope of curve 140 is not parallel to ramp 142 to cause signal voltage $E_9$ to become either positive or negative, relay CR4 will be energized to prevent energization of relay CR5. When, however, the slope of curve 140 is parallel to ramp 142, signal voltage $E_9$ will go to zero. As a result, the output of amplifier 154 will be zero, and relay CR4 will therefore be de-energized.

With relay CR4 de-energized, contacts CR4–1 will be closed to provide an energizing circuit for relay CR5 when relay CR2 is energized to close contacts CR2–1. It is therefore clear that relay CR5 will be energized only when the load cell signal $E_1$ decreased to the voltage level calling for the initiation of the refill cycle and when the differential for the measured difference between signals $E_1$ and $E_3$ is zero. If one of the peaks of curve 140 does not coincide with the lower threshold of signal voltage $E_1$ which is necessary for energizing relay CR2, energization of relay CR5 will occur at the first peak after signal $E_1$ passes through its zero level.

Energization of relay CR5 closes two sets of normally open contacts CR5–1 and CR5–2. Contacts CR5–1 are in parallel with contacts CR2–1 and CR4–1 to provide a holding circuit for maintaining relay CR5 energized even though contacts CR2–1 or CR4–1 may subsequently open. By closing contacts CR5–2 a circuit is completed through a set of normally closed contacts T1–1 of a slow-pull-in timer T1 to energize relay CR1.

Energization of relay CR1 closes contacts CR1–3, opens contacts CR1–1 and CR1–2, and closes two additional sets of normally open contacts CR1–4 and CR1–5. Contacts CR1–4 are in parallel with contacts CR5–2 to maintain relay CR1 energized when contacts CR5–2 subsequently open. A set of normally closed contacts CR7–3 of a relay CR7 and a set of normally closed contacts CR8–2 of relay CR8 are in the holding circuit for relay CR1 in series with contacts CR1–4. Relay CR7, however, will be de-energized except when it is desired to selectively change the feed rate in a manner to be described in detail later on.

By closing contacts CR1–5, a solenoid S1 is energized through a set of normally closed contacts CR3–2 of relay CR3, a set of normally closed contacts CR8–3 of a relay CR8, and a set of normally closed contacts CR7–2 of relay CR7. Solenoid S1 is operatively connected to gate 42 and when energized opens gate 42 to allow material in bin 40 to flow into hopper 16.

By opening contacts CR1–1, wiper 74 is disconnected from amplifier 80, and by closing contacts CR1–3 amplifier 80 is converted into a unity gain amplifier and is connected to the output circuit of filter 64. As a consequence, signal $E_8$ is replaced with signal $E_1$ and amplifier 80, by virtue of being converted into a unity gain amplifier, tracks the load cell output signal $E_1$ as hopper 16 is refilled with material from bin 40.

As a result of the foregoing switchover, signal $E_4$ representing the measured difference between signals $E_1$ and $E_3$, will become zero. As a result, there will be a small step change in the signal voltage that is applied to the input circuit of controller 68. This condition also exists in the control circuit described in the previously mentioned Pat. No. 3,329,313, and for the circuitry shown in Pat. No. 3,329,313 it objectionably results in a corresponding step response in the output voltage signal of the two-mode, proportional plus reset controller.

With the control circuit of this invention the foregoing objectionable step response is avoided by virtue of opening contacts CR1–2 when relay CR1 is energized to switch to the tracking mode and to initiate the refill cycle. By opening contacts CR1–2, the input circuit of amplifier 88 is electrically disconnected from resistors 94, 96, and 102, capacitor 104, and amplifier 86. If contacts CR1–2 were removed from controller 68, a step change in signal voltage $E_5$ would occur in response to the step change in signal $E_4$ by virtue of the differentiating function performed by capacitor 104.

In the control circuit of this invention, however, amplifier 88 will be disconnected from capacitor 104 when the switchover is made to cause circuit 70 to track the load cell output signal $E_1$. The voltage applied to the inverting terminal of amplifier 88 will therefore be the charge on capacitor 98 at the moment relay CR1 was energized. Thus, regardless of any step change that may occur in signal voltage $E_4$ as a result of switching over to the tracking mode, no correseponding step change will occur in signal voltage $E_5$, and signal voltage $E_5$ will be retained at the value it had at the moment relay CR1 was energized to reduce signal voltage $E_4$ to zero.

From the foregoing description it is clear that controller 68 cannot be locked to fix the value of signal $E_5$ for the refill cycle until the differential of the measured difference between signals $E_1$ and $E_3$ goes to zero. The fixed or steady state value of signal $E_5$ will therefore provide for the optimum corrective action during the refill cycle, for it is representative of the error signal when the discharge rate of material from hopper 16 was detected by the load cell to be at the desired or preselected rate.

By delivering material to hopper 16 during the refill cycle, load cell signal $E_1$ increases, and as soon as it becomes slightly positive, diode 110 again becomes forward biased to deenergize relay CR2. Contacts CR2–1 therefore open, but relay CR5 will remain energized through contacts CR5–1.

When the weight of material delivered to hopper 16 reaches an upper level, which is determined by the preselected setting of potentiometer 124, the algebraic summation of signal voltages applied at junction 118 goes positive. This voltage condition, as previously described, causes diode 116 to become reverse biased. As a consequence, relay CR3 is energized to open the normally closed contacts CR3–1 and CR3–2 and to close the normally open contacts CR3–3.

By opening contacts CR3–2, solenoid S1 is de-energized to close gate 42 and thereby cut off the delivery of material to hopper 16. This terminates the refill cycle.

By opening contacts CR3–1, relay CR5 is de-energized to open contacts CR5–1 and CR5–2. As a result of opening CR5–1, the holding circuit for relay CR5 is reset. Relay CR1 will not be de-energized when contacts CR5–2 open, for at this stage the energizing circuit for relay CR1 is completed through contacts T1–1 and CR1–4.

By closing contacts CR3–3, a circuit is completed for energizing timer T1. After a short delay, allowing sufficient time for the scale to stabilize, timer T1 times out to open contacts T1–1. As a result, relay CR1 is de-energized to close contacts CR1–1 and CR1–2 and to open contacts CR1–3, CR1–4, and CR1–5.

By opening contacts CR1–3 and by closing contacts CR1–1, the rate-setting reference signal voltage $E_8$ is re-applied to circuit 70 in place of the load cell signal voltage $E_1$, and circuit 70 resumes its integrating function to generate the rate setting ramp signal $E_3$. By opening contacts CR1–5, a circuit for re-energizing solenoid S1 cannot be completed by virtue of closing contacts CR3–2 later on. Opening of contacts CR1–4 resets the holding circuit for relay CR1.

As a result of closing contacts CR1–2, the input circuit of amplifier 88 is re-connected to the common junction between resistor 96 and capacitor 104, and controller 68 consequently resumes its normal proportional plus reset action as already described. The rate at which material is fed away from hopper 16 will therefore be once again under the control of the measured difference between signals $E_1$ and $E_3$, and since material is no longer being delivered to hopper 16, signal $E_1$ will begin to decrease.

There will be a slight lag between the time that relay CR3 is energized to terminate the refill cycle and the time that gate 42 closes completely to fully cut off the delivery of material to hopper 16. As a result, the load cell output signal $E_1$ will increase slightly beyond the voltage level at which relay CR3 was energized. When the flow of material to hopper 16 is fully terminaed, single $E_1$ begins to decrease in the manner previously explained.

The initial decrease in signal $E_1$ causes the algebraic summation of signals $E_1$ and $E_7$ to again become negative with the result that diode 116 again becomes forward biased to de-energize relay CR3. De-energization of relay CR3 opens contacts CR3–3 to reset timer T1 and closes contacts CR3–1 and CR3–2 in preparation for the next refill cycle. In the foregoing manner, controlled discharge of material from hopper 16 is continuously maintained during and between the periodic refill cycles.

In the control circuit described in the previously mentioned Pat. No. 3,329,313, the two-mode proportional plus reset controller does not respond immediately to an abrupt, selective change in the set point, rate setting potentionmeter which is connected to the input of the integrator circuit. Instead, there is a lag that could, depending on the circuit component values, extend to approximately 30 seconds before the output signal voltage of the controller assumes a value to correct the feed rate to correspond with the newly selected rate.

The circut of this invention avoids such an error in feed rate by providing a rate setting switch 170 (FIG. 2A), which is closed when it is desired to change the setting of potentiometer wiper 74. By closing switch 170, one circuit is completed through a diode 172 to energize relay CR1 and a second circuit is completed through another diode 174 to energize relay CR7.

As a result of energizing relay CR1, contacts CR1–1 and CR1–2 open, and contacts CR1–3, CR1–4, and CR 1–5 close as previously described. By energizing relay CR7, a set of normally open contacts CR7–1 (FIG. 2) are closed and normally closed contacts CR7–2 and CR 7–3 are opened.

By opening contacts CR1–2 and by closing contacts CR7–1, the inverting input terminal of amplifier 88 is disconnected from the common junction between resistor 96 and capacitor 104 and is connected through a dropping resistor 178 to the output circuit of voltage follower 76. As a result, the intermediate controller signal $E_6$ is replaced with the rating setting potentiometer voltage indicated at $E_8$.

As shown in FIG. 2, resistor 178 has its terminals respectively connected to the output of voltage follower 76 and to a junction 180. A feedback resistor 182 has its terminals respectively connected to junction 180 and to the output circuit of ampilfier 88. Junction 180 is connected through contacts CR7–1 to the inverting terminal of amplifier 88 so that the branch containing resistor 182 in series with contacts CR7–1 is in parallel with capacitor 98. The values of resistors 178 and 182 are made equal to convert ampilfier 88 into a unity gain amplifier when contacts CR7–1 are closed.

By closing switch 170, therefore, capacitor 98 will be charged by the potentiometer signal voltage $E_8$ and the output of amplifier 88 will become equal to $-E_8$ by virtue of having connected resistor 182 in a feedback loop in parallel with capacitor 98. The setting of wiper 74 may now be changed selectively to provide a new feed rate, and the response of signal $E_5$ to such a change will be immediate. As a consequence, there is no time lag during which the feed rate does not reflect the new setting of potentiometer 72.

In addition to converting amplifier 88 into a unity gain amplifier and causing it to track the voltage at the wiper of potentiometer 72, the closing of switch 170 also converts integrator circuit 70 into a unity gain amplifier and causes it to track the load cell output signal voltage $E_1$ by virtue of energizing relay CR1 to respectively open and close contacts CR1–1 and CR1–3. As a result, the new ramp signal $E_3$ generated by circuit 70 upon switching back to potentiometer 72 will start at a voltage which is equivalent to the load cell signal voltage $E_1$.

By opening contacts CR7–2 as a result of energizing relay CR7, solenoid S1 cannot be energized to open gate 42 when switch 170 is closed preparatory to the resetting of potentiometer 72. By opening contacts CR7–3, relay CR1 cannot be latched in its energized condition and will therefore de-energize when switch 170 is subsequently opened.

After switch 170 is closed, potentiometer 72 is adjusted to provide the new feed rate. Switch 170 is then reopened to de-energize relays CR1 and CR7, and control circuit 60 will now function to control the material feed rate at the new potentiometer setting.

To ensure that the ramp signal $E_3$ starts at a voltage which is equivalent to the load cell output signal $E_1$ when operation of the feeder is initiated, a further energizing circuit for relay CR1 is provided through a set of normally open contacts CR8–1 of relay CR8. Relay CR8 is energized through one pole 196 (FIG. 2A) of a double pole master switch 195. The other pole 194 (FIG. 2) of switch 195, when thrown, provides for the energization of winding 48 by connecting it to module 130. In its off position, switch 195 interrupts the energizing circuit for winding 48 and compeltes the energizing circuit for relay CR8. With relay CR8 energized, contacts CR8–1 are closed to provide an energizing circuit for relay CR1 through contacts T1–1. Contacts CR1–1 will thus be open, and contacts CR1–3 will be closed. Capacitor 84 will therefore be charged by signal voltage $E_1$ when the feeder is deactivated.

Contacts CR8–2, which are in series with contacts CR1–4 and CR7–3, open when relay CR8 is energized to prevent the completion of the holding circuit for relay CR1 through contacts CR1–4. Normally closed contacts CR8–3 are in series with contacts CR3–2, CR1–5, CR7–2 and solenoid S1 and open when relay CR8 is energized to prevent energization of solenoid S1 when contacts CR1-5 close by virtue of energizing relay CR1.

Operation of the feeder is started by throwing switch 195 to its closed position. This energizes winding 48 through pole 196 and de-energizes relay CR8. De-energization of relay CR8 de-energizes relay CR1 to close contacts CR1-1 and to open contacts CR1-3. Integrator circuit 70 consequently resumes its normal integrating function with the voltage $E_8$ at the wiper of potentiometer 72 acting as the input signal. Having charged capacitor 84 when the feeder was off, the ramp output signal $E_3$ thus starts out at a value equivalent to the hopper 16 and changes at the rate determined by the setting of wiper 74.

The foregoing feed rate control circuit may also be applied to control measurable variables other than material or fluid feed rate such as, for example, temperature. The control circuit of this invention may also be applied to control variable conditions such as the feed rate of an electrode or an electrode furnace.

Figure 4:
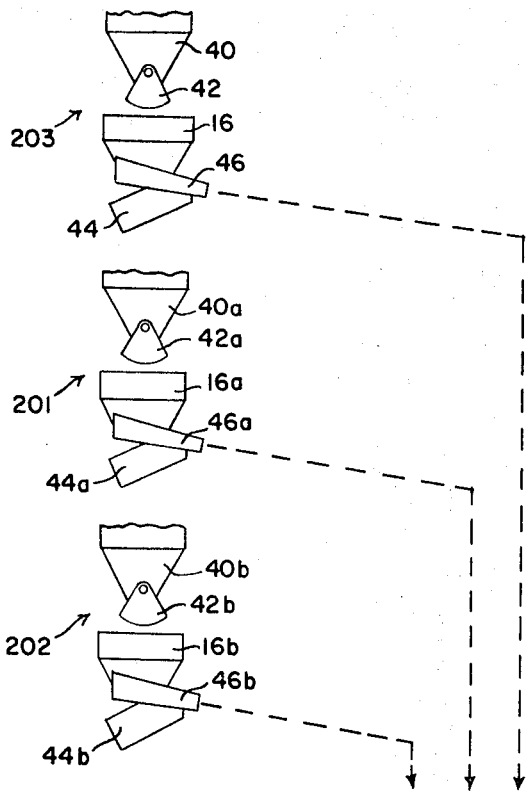
FIG. 4 is a diagrammatic view of a continuous mixing or blending system containing a plurality of the feeders shown in FIG. 1.

A typical continuous mixing or blending system is illustrated in FIG. 4 wherein the feeder of FIG. 1 and two additional feeders indicated at 201 and 202 each are operative to deliver different materials to a common source. The feeder of FIG. 1 is indicated at 203 in FIG. 4.

Feeders 201 and 202 are the same as that shown in FIGS. 1 and 2 and together with feeder 203 deliver their materials at independently selected, substantially constant rates. Like reference numerals suffixed by the letters $a$ and $b$ have been applied to designate like elements of feeders 201 and 202 respectively.

In continuous mixing systems of the foregoing type, it sometimes is desired to adjust the rate at which the mixture of materials is produced without altering the pre-selected proportional relation of the feed rates of materials making up the mixture. This could be accomplished by individually adjusting the rate setting, set point potentiometers in each feeder to proportionately increase or decrease the feed rate of each material. Such multiple adjustments, however, are time consuming and could be relatively complicated. In addition, a problem occurs in sequentially making rate adjustment of the materials in that during the course of such sequential adjustment, the proportions of the materials making up a blend will be incorrect.

The foregoing objectionable conditions are avoided by this invention which provides a master control potentiometer 210 (FIG. 2). The resistor terminals of potentiometer 210 are respectively connected to ground and through a dropping resistor 212 to the negative D.C. terminal of module 130. The wiper of potentiometer 210 is connected to the non-inverting input terminal of a voltage follower amplifier 214.

As shown in FIG. 2, one terminal of the resistor of potentiometer 72 is connected to the output circuit of voltage follower 214, the other resistor terminal being connected to ground. The corresponding potentiometers of feeders 201 and 202 are indicated at 72a and 72b respectively in FIG. 2. The resistor terminals of each of the potentiometers 72a and 72b are respectively connected to ground and the output circuit of voltage follower 214 similar to potentiometer 72.

By adjusting potentiometer 210 the voltage at the corresponding resistor terminals of potentiometers 72, 72a, and 72b will be proportionately and simultaneously changed. In this connection, it is clear that the voltages applied to these termials will be equal and proportional to the voltage at the wiper of potentiometer 210. Thus, by adjusting potentiometer 210 the slopes of the rate-setting ramp signal voltages for feeders 201–203 are proportionately changed with the result that all of the material feed rates are simultaneously and correspondingly altered; as a result the rate of production in the mixing operation may easily and simply be controlled. The changing of all of the feed rates at the same time avoids the previously mentioned objectionable conditions attributable to sequentially altering the material feed rates. In this connection, it will be appreciated that if all of the feed rates of the materials making up the blend are not changed at the same time, the relative proportions of the materials delivered during the period of sequential feed rate adjustment will not be equal to the desired, pre-selected values.

It is clear that simultaneous change in the feed rates of the materials making up the blend is desired in systems where all of the feeders in the system deliver the materials to a common receptacle or space as distinguished from systems where the feeders are, for example, arranged in a row to deliver the materials to different regions on a moving belt.

The circuit components shown in FIG. 2, are so selected and arranged in the previously described manner that they are readily applied to printed circuit cards. For example, amplifiers 108 and 114 together with diodes 110 and 116, resistors 112, 120, and 126 and the associated junction may be applied to one card. Filter 64, amplifier 62, amplifier 214, and follower 76 may respectively be applied to separate cards. Integrating circuit 70 may be applied to yet another card, and amplifier 66 may be applied to still another card. Still another card may contain the circuitry for controller 68, and a further card may contain the circuit for differentiator 146. Finally, another card may contain amplifier 154, resistor 156, and diodes 158 and 160.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a rate control, material feeding apparatus including a receptacle for receiving material and having an outlet through which the material is fed away from said receptacle, and material feed rate control means including means for producing a rate-correcting signal, the value of which is variable by the relationship of the weight of material in said receptacle to a pre-selected rate-setting condition for maintaining the rate at which the material is fed away from said receptacle at a value closely approaching a constant, the improvement comprising means for developing a first conditioning signal in response to a predetermined depletion of material in said receptacle, means responsive when the rate of change in the depleting weight of material in said receptacle becomes equal to said constant for developing a second conditioning signal, and means responsive to the development of said second conditioning signal simultaneously with or after the development of said first conditioning signal for (a) filling said receptacle with a predetermined amount of material and (b) clamping said rate-correcting signal, while said receptacle is being filled, at the value it had when said rate of change became zero simultaneously with or after the development of said first conditioning signal.

2. In a rate control, material feeding apparatus having a receptacle for receiving material and including an outlet through which the material is fed away from said receptacle, means for producing an electrical signal representative of the weight of material in said receptacle, means for producing an electrical, pre-set, rate-setting ramp signal, means for producing a rate-correcting signal, the value of which is controlled by the deviation of said weight-representative signal from said ramp signal during depletion of material in said receptacle, and means responsive to said rate-correcting signal for controlling the rate at which material is fed away from said receptacle, the improvement comprising means responsive to a predetermined depletion of material in said receptacle for developing a first electrical conditioning signal, means responsive when the rate of change of said weight-representative signal becomes equal to the rate of change of said ramp signal for developing a second electrical conditioning signal, and means responsive to the development of said second conditioning signal simultaneously with or after the development of said first conditioning signal for (a) filling said receptacle with a predetermined amount of material and (b) holding said rate-correcting signal, while said receptacle is being filled, substantially steady at the value it had when the rate of change of said weight-representative signal became equal to the rate of change of said ramp signal simultaneously with or after the development of said first conditioning signal.

3. The rate control, material feeding apparatus defined in claim 2 wherein said means for developing said second conditioning signal comprises means for producing a third electrical conditioning signal having a magnitude representative of a value obtained by differentiating the algebraic sum of said weight-representative and ramp signals with respect to time, and means controlled by said third conditioning signal producing means for producing said second conditioning signal when said third conditioning signal becomes zero.

4. The rate control material feeding apparatus defined in claim 3 wherein said rate-correcting signal producing means further comprises means for electrically comparing said weight representative signal with said ramp signal for producing an electrical error signal representative of the deviation of said weight-repersentative signal from said ramp signal and means responsive to the magnitude and duration of said error signal for controlling the magnitude of said rate-correcting signal, and wherein said third conditioning signal producing means comprises means for differentiating said error signal with respect to time.

5. The rate control, material feeding apparatus defined in claim 2 wherein said first conditioning signal developing means comprises means for producing a pre-set electrical reference signal repersentative of the weight of said predetermined depletion of material and means controlled by the deviation of said weight representative signal from said reference signal for obtaining said first condtioning signal when the deviation between said weight representative and reference signals passes a predetermined threshold.

6. The rate control, material feed apparatus defined in claim 2 wherein said ramp signal has a slope whose rate of change is constant, and wherein said rate corrective signal is varied to maintain the rate at which material is fed away from said receptacle at a value closely approaching a constant.

7. In a rate control, material feeding apparatus including a receptacle for receiving material and having an outlet through which the material is fed away from said receptacle, means for producing an electrical signal representative of the weight of material in said receptacle, means for producing a pre-set, rate-setting electrical ramp signal, an electrical controller having an amplifier for developing at its output an electrical rate-correcting signal, circuit means forming a part of said controller and being operatively connected between the input of said amplifier and said weight-representative signal and ramp signal producing means for controlling the magnitude of said rate-correcting signal in accordance with the deviation of said weight-representative signal from said ramp signal and the duration of said deviation, means responsive to said rate-correcting signal for controlling the rate at which material is fed away from said receptacle, and means for filling said receptacle with a predetermined amount of material when the supply of material in said receptacle depletes by a predetermined amount, the improvement comprising means for electrically disconnecting said amplifier from said circuit means while said receptacle is being filled.

8. The rate control material feeding apparatus defined in claim 7 wherein said means for electrically disconnecting said amplifier from said circuit means comprises means for developing a first electrical conditioning signal in response to said predetermined depletion of material, means responsive to the rate of change of said weight-representative signal relative to the rate of change of said ramp signal for developing a second electrical conditioning signal when the rate of change of said weight-representative signal becomes equal to the rate of change of said ramp signal, and means responsive to the development of said second conditioning signal simultaneously with or after the development of said first conditioning signal for effecting the electrical disconnection of said amplifier from said circuit means, said means for filling said receptacle also being responsive to said first and second conditioning signals to initiate delivery of said predetermined amount of material only when said second conditioning signal is developed simultaneously with or after the development of said first conditioning signal.

9. In a rate control, material feeding apparatus including a receptacle for receiving material and having an outlet through which the material is fed away from said receptacle, means for producing an electrical signal that is representative of the weight of material in said receptacle, means for producing a selectively adjustable electrical reference signal of constant value, an integrating circuit operatively connected to said reference signal producing means for developing an electrical ramp signal having a slope determined by the adjusted value of said reference signal, an amplifier for producing at its output an electrical rate-correcting signal, circuit means operatively connected between the input of said amplifier, said integrating circuit, and said weight-representative signal producing means for placing said rate-correcting signal under control of said ramp and weight-representative signals, and means responsive to said rate-correcting signal for controlling the rate at which material in said receptacle is fed away therefrom, the improvement comprising means for selectively disconnecting said amplifier from said circuit means and connecting it directly to said reference signal producing means for impressing said reference signal directly upon said amplifier when making a selective adjustment of said reference signal.

10. The rate control material feeding apparatus defined in claim 9 comprising means for converting said amplifier into a unity gain amplifier upon its connection to said reference signal producing means, whereby the magnitude of said rate-correcting signal becomes equal to the magnitude of said reference signal to track said reference signal upon selective adjustment thereof.

11. The rate control material feeding apparatus defined in claim 9 comprising means operated simultaneously with the connection of said amplifier to said reference signal producing means for (a) impressing said weight-representative signal on said integrator circuit means in place of said reference signal and (b) rendering said integrator circuit means operative to track said weight representative signal such that the magnitude of the signal produced by said integrator circuit becomes equal to the magnitude of said weight-representative signal.

12. In a rate control, material feeding apparatus, a plurality of feeders each being operative to impart movement to material for feeding it to a pre-selected location, means operatively associated with said feeders for controlling the rate at which they feed material independently of each other, a plurality of rate-setting devices forming a part of said rate controlling means and being operatively associated one with each of said feeders, each of said rate-setting devices being operative to produce an electrical reference signal, the value of which determines the rate at which its associated feeder feeds material, and a master rate control device electrically connected to each of said rate-setting devices and being selectively adjustable to proportionately vary the values of the reference signals produced by said rate-setting devices.

13. The rate control master in claim 12 wherein said rate control device produces an electrical signal the magnitude of which is selectively adjustable and which is additively superimposed upon said reference signals.

14. In a rate control, material feeding apparatus having a plurality of feeders for feeding separate masses of material to a pre-selected location, means operatively connected to each of said feeders for controlling the rate at which each feeder feeds material independently of each other, and master rate control means operatively connected to said rate controlling means of each feeder and providing a single adjustment for selectively varying the rates at which all of the feeders of said plurality feed material.

15. The rate control, material feeding apparatus defined in claim 14 wherein the rate controlling means, which is operatively connected to each of said feeders, is operative to maintain the rate at which each feeder feeds material at a preselected, essentially constant value, and wherein said master rate control means is operative by said single adjustment to proportionately vary the rates at which said plurality of feeders feed their respective masses of material.

16. The rate control, material feeding apparatus defined in claim 15 wherein said master rate control means is operative to selectively effect a simultaneous variation of the rates at which said plurality of feeders feed their respective masses of material.

17. In a material feeding apparatus having a plurality of feeders each operative to feed material to a pre-selected location, and a corresponding plurality of rate-setting devices, each of said devices being operatively connected to one of said feeders and being selectively adjustable for setting the rate at which its associated feeder feeds material, the improvement comprising selectively operable means for simultaneously changing the rates at which said plurality of feeders feed said material without altering the selected settings of said rate-setting devices.

18. In a material feeding apparatus having a plurality of feeders each operative to feed material to a pre-selected location, and a corresponding plurality of rate-setting devices, each of said devices being operatively connected to one of said feeders and having a control part that is selectively positionable to different settings for varying the rate at which its associated feeder feeds material, the improvement comprising selectively operable means electrically connected to said plurality of rate-setting devices for simultaneously and proportionally changing the rates at which said plurality of feeders feeds said material without altering the selected, rate-setting positions of said control parts.

References Cited
UNITED STATES PATENTS

| | | | |
|---|---|---|---|
| 3,329,313 | 7/1967 | Mayer | 222—58 |
| 3,481,509 | 12/1969 | Marhauer | 222—58 X |

SAMUEL F. COLEMAN, Primary Examiner

UNITED STATES PATENT OFFICE
CERTIFICATE OF CORRECTION

Patent No. 3,532,253                    Dated   October 6, 1970

Inventor(s)        Gilbert A. Godwin

It is certified that error appears in the above-identified patent and that said Letters Patent are hereby corrected as shown below:

Column 4, line 25, change "58" to "16".
Column 4, line 35, change "Contorl" to "Control".
Column 4, line 39, change "feder" to "feeder".
Column 4, line 44, change "therin" to "therein".
Column 4, line 44, change "ben" to "been".
Column 4, line 72, after 76 insert --is--.
Column 5, line 20, change "cpntrolled" to "controller".
Column 5, line 36, change "$t-E_2R_1C_1$" to "$-E_2t/R_1C_1$."

Column 5, line 50, after $E_3$ insert the --)--.
Column 6, line  4, change "clamed" to "clamped".
Column 8, line 63, change "as" to "is".
Column 9, line 29, insert a period (.) after the word period.
Column 9, line 50, insert "E" after --d--.
Column 10, line 19, correct "corective" to "corrective".

Column 11, line 52, change "for" to --of--.
Column 12, line 66, place a hyphen (-) between de-energize.
Column 13, line  9, after "opening" insert -- contacts --.
Column 13, line 42, correct the spelling "terminated".
Column 14, line 62, correct the spelling "completes".
Column 17, line 33, correct the spelling of "representative".
Column 17, claim 5, line 43, correct the spelling of "representative".
Column 17, claim 5, line 46, correct the spelling of "conditioning".
Column 19, claim 15, line 22, insert a hyphen (-) between "pre-selected."

Signed and sealed this 27th day of April 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,532,253  Dated October 6, 1970

Inventor(s) Gilbert A. Godwin

It is certified that error appears in the above-identified patent and that said Letters Patent are hereby corrected as shown below:

Column 5, line 36, change "$t-E_2R_1C_1$" to "$-E_2^t/R_1C_1$".

Signed and sealed this 14th day of September 1971.

(SEAL)
Attest:

EDWARD M. FLETCHER, JR.  ROBERT GOTTSCHALK
Attesting Officer  Acting Commissioner of Patents